(12) United States Patent
Ushijima

(10) Patent No.: US 6,548,185 B1
(45) Date of Patent: Apr. 15, 2003

(54) FEATHERY COPPER FIBER BODY, PROCESS FOR PRODUCTION THEREOF, AND COPPER MICROCOIL

(75) Inventor: Hitoshi Ushijima, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/464,087

(22) Filed: Dec. 16, 1999

(30) Foreign Application Priority Data

Dec. 17, 1998 (JP) .......................................... 10-359595

(51) Int. Cl.[7] .............................. D02G 3/22; D02G 3/12
(52) U.S. Cl. ...................... 428/606; 428/364; 428/369; 428/605; 428/903
(58) Field of Search ................................ 428/605, 606, 428/903, 364, 369

(56) References Cited

U.S. PATENT DOCUMENTS

| | | | | |
|---|---|---|---|---|
| 3,902,865 A | * | 9/1975 | Leavenworth et al. ...... 428/605 |
| 4,122,143 A | * | 10/1978 | Momotari et al. .......... 264/104 |
| 4,880,170 A | * | 11/1989 | Kemp, Jr. et al. ............. 241/5 |
| 6,036,839 A | * | 3/2000 | Kohut et al. ................ 205/574 |

FOREIGN PATENT DOCUMENTS

GB   1 570 731   4/1977   ........... C22B/15/12

OTHER PUBLICATIONS

Japanese Abstract No. 480898825 dated 1974 (no month).
S. Brenner, The Growth of Whiskers by the Reduction of Metal Salts, vol. 4., Jan. 1956, pp. 62–74.
S. Kittaka et al., Growth of Copper Whiskers from Cupric Oxide, vol. 4., No. 9, Sep. 1965, pp. 661–666.

* cited by examiner

Primary Examiner—Deborah Jones
Assistant Examiner—A Piziali
(74) Attorney, Agent, or Firm—Sughrue Mion, PLLC

(57) ABSTRACT

To provide a feathery copper fiber body which can be uniformly dispersed in a resin composition, rubber composition, low melting metal, coating compound, adhesive, etc. to exert an effect of electrically and mechanically modifying the matrix. A fiber body made of copper, which is feathery.

8 Claims, 3 Drawing Sheets

FEATHERY COPPER FIBER BODY, PROCESS FOR PRODUCTION THEREOF, AND COPPER MICROCOIL

BACKGROUND OF INVENTION

1. Field of the Invention

The present invention relates to a copper fiber body to be incorporated in various resin compositions, rubber compositions, low melting metals, coating compounds or adhesives as an electrically-conducting material, electromagnetic barrier material, reinforcing material or the like.

2. Related Art

As a copper fiber body there has been widely known copper whisker. In 1956, S. S. Blenner obtained copper whisker by reducing a copper halide in hydrogen gas. In 1965, Tachibana and Kishi succeeded in producing a considerably small copper whisker while controlling the rate of reduction reaction of copper halide with carbon dioxide gas produced by the reaction of charcoal with air in a closed air system.

However, these methods are disadvantageous in that the resulting yield is too low. Further, the resulting copper whisker cannot be considered small enough in size. Thus, such a copper whisker can be hardly incorporated in resin compositions, rubber compositions, low melting metals, coating compounds or adhesives as a filler. Further, such a copper whisker can hardly be uniformly dispersed in these materials during addition. Accordingly, the resulting effect, e.g., effect of enhancing mechanical properties such as strength or effect of improving electrical conductivity is not sufficient.

On the other hand, copper fibers available other than these copper whiskers have a diameter of as great as 50 $\mu$m and a great length and thus cannot give good results when used as a filler. Further, an electrolytic copper powder is in the form of grain having an aspect ratio of as low as 2 and thus is not an optimum filler material with respect to effect of improving mechanical properties and electrical conductivity.

SUMMARY OF INVENTION

An object of the present invention is to provide a copper fiber body which can give solution to the foregoing problems with the conventional techniques, that is, can be uniformly dispersed in resin compositions, rubber compositions, low melting metals, coating compounds, adhesives or the like to exert a great effect of electrically or mechanically modifying these materials.

The copper fiber body according to the present invention is a fiber made of copper which is feathery to solve the foregoing problems.

The feathery copper fiber body according to the present invention is a novel fiber body which can be incorporated in high molecular materials as an electrically-conducting material, electromagnetic barrier material or reinforcing material to provide these matrixes with excellent properties.

DETAILED DESCRIPTION OF PREFERRED EMBODIMENTS

Figure 1:
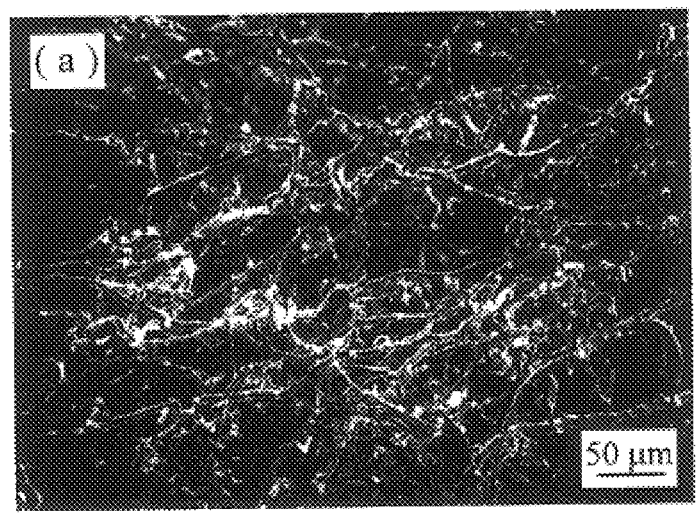
FIG. 1 is a scanning electron microphotograph illustrating a feathery copper fiber body according to the present invention.

In the present invention, the term "feathery" as used herein is meant to indicate the shape of fiber having branches, i.e., feather, particularly so-called down feather. In other words, a feathery material is a single fiber body which is branched and thus looks like a fiber mass made of a plurality of fibers.

Though having a shape different from that of such a feathery material, zinc oxide or the like in the form of tetrapod is known. Such a tetrapod-shaped comprises substantially complete whiskers. Thus, the protrusion constituting the tetrapod portion is acicular and rigid rather than fibrous. On the contrary, the feathery copper fiber body, i.e., the fiber portion constituting the various branches of the feathery copper fiber body has a curve at some points and thus is obviously poor in rigidity and fibrous. The regularity in the curve of the fiber portion constituting the various branches of the feathery copper fiber body is normally poor. However, the fiber portion forms a regularly formed coil at some points. The thickness of the fiber portion constituting the various branches of the feathery copper fiber is from 0.1 to 25 $\mu$m. The fiber portion has a constriction (extreme change in the fiber diameter) at some points.

As mentioned above, the feathery copper fiber body according to the present invention is branched and is curved and constricted at some points. The overall length of the feathery copper fiber body according to the present invention is not more than 4 cm. The diameter of the feathery copper fiber body according to the present invention varies widely from not less than 0.1 $\mu$m to not more than 25 $\mu$m. Accordingly, the feathery copper fiber body according to the present invention differs quite from the conventional copper whisker, copper fiber and electrolytic copper powder in concept.

Due to the foregoing configuration, the feathery copper fiber body according to the present invention can be uniformly dispersed in even a matrix having a great density difference from copper such as resin composition, rubber composition, coating compound, low melting metal and adhesive. As a result, the feathery copper fiber body according to the present invention can exert an enhanced effect of improving the mechanical and electrical properties of the matrix. Further, the feathery copper fiber body according to the present invention can be easily dispersed in the matrix.

Since the feathery copper fiber body according to the present invention is constricted at some points, it exhibits an excellent adhesivity to the matrix. Combined with its great contact area, the foregoing effect can be enhanced.

The feathery copper fiber body according to the present invention may or may not be ground before being incorporated in the matrix. In some detail, if normally ground, the feathery copper fiber body according to the present invention can remain fibrous, even constricted, curved and branched, though partially, making it possible to provide excellent properties as a fibrous filler.

Such an excellent feathery copper fiber body can be obtained by subjecting a copper halide to reduction with a particulate carbon in an atmosphere of a weak reducing agent.

Examples of the copper halide employable herein include copper chloride, copper bromide, and copper iodide. These copper halides can be used regardless of oxidation number so far as they act as a copper element source. For example, both cupric chloride (II) and cuprous chloride (III) can be used. In the present invention, for the purpose of accelerating the growth of copper microfiber, a halide of a metal other than copper may be incorporated in an amount of from not less than 1% by weight to not more than 20% by weight based on the weight of the copper halide. Examples of such a halide of a metal other than copper include nickel chloride, tin chloride, and lead chloride.

As the foregoing particulate carbon there may be used carbon black. Besides carbon black, a particulate material mainly composed of carbon obtained by the carbonization of an organic material may be used. The particulate carbon and the copper halide may be used in proper admixture.

The weak reducing agent to be used herein comprises a component which makes no direct participation in the production of copper whisker unlike strong reducing agents which have heretofore been used in the production of copper whisker such as hydrogen gas. In other words, if hydrogen is used as a strong reducing agent, oxygen in water or alcohol and carbon in alcohol or hydrocarbon each correspond to such a component which makes no direct participation in the production of copper whisker.

Unlike a strong reducing agent such as hydrogen gas, such a weak reducing agent having a component which makes no direct participation in the production of copper whisker doesn't allow the gas phase growth of copper fiber having a complete single crystal structure. This presumably causes the formation of a feathery copper fiber body. Examples of such a weak reducing agent include water, alcohols, and hydrocarbons. These weak reducing agents may be used singly or in combination.

Examples of the foregoing alcohols include methyl alcohol, and ethyl alcohol. Examples of the foregoing hydrocarbons include methane, ethane, ethylene, acetylene, and benzene.

The weak reducing agent atmosphere to be used herein may be composed of the foregoing weak reducing agent in an amount of 100% by volume. The use of an atmosphere consisting of a weak reducing agent and an inert gas makes it possible to enhance the yield in production.

In some detail, the content of the weak reducing agent in the foregoing weak reducing agent atmosphere is preferably not more than 80% by volume. Further, if the content of the weak reducing agent is not more than 40% by volume, the yield in production can be further enhanced.

As the foregoing inert gas there may be used a chemically inert gas. Examples of such a chemically inert gas include argon gas, helium gas, and nitrogen gas.

The combined use of the copper halide and the halide of a metal other than copper such as nickel chloride, tin chloride and lead chloride makes it possible to accelerate the growth of the feathery copper fiber body. The amount of the metal halide to be used is preferably from not less than 0.1% by weight to not more than 40% by weight based on the weight of copper element in the copper halide. If the amount of the metal halide falls below 0.1% by weight, the resulting effect exerted by the foregoing combined use is insufficient. On the contrary, if the amount of the metal halide exceeds 40% by weight, the copper thus produced can be mixed with a large amount of the particulate metal added.

The heat treatment of the foregoing starting materials at a temperature of from not lower than 400° C. to not higher than 800° C. in the foregoing atmosphere for 30 minutes to 24 hours makes it possible to obtain a feathery copper fiber body according to the present invention. The feathery copper fiber body thus produced can be in the form of felt-like fiber mass comprising fibers complicatedly entangled under some conditions (e.g., size and temperature of the treating furnace, atmosphere). Such a form of feathery copper fiber body can be used as an electromagnetic shielding material or the like as it is. If the treatment temperature exceeds 800° C., the starting material copper halide vaporizes away from the reaction system, lowering the yield in production.

Under some production conditions, the production of the feathery copper fiber body according to the present invention can be accompanied by the subsidiary production of linear copper fiber or granular copper powder. However, these by-products, if present in an amount of 50% by weight, can be uniformly dispersed in any matrix as a filler. The resulting product can be provided with excellent physical (mechanical, electrical) properties. The feathery copper fiber body and carbon can be easily divided into two different phases by making the use of the lipophilicity of carbon and the hydrophilicity of copper.

Further, the combined use of the weak reducing agent and the strong reducing agent, i.e., reducing gas such as hydrogen and carbon monoxide makes it possible to produce feathery copper fiber bodies having various shapes in an enhanced yield. In other words, by increasing the concentration of such a strong reducing agent in the atmosphere, a feathery copper fiber body which is considerably less branched but has many linear portions can be obtained in a good yield.

EXAMPLE

The process for the production of the copper fiber body of the present invention will be further described hereinafter.

As carbon black there was used Denka Black FX-35 (hereinafter referred to as "CB") produced by DENKI KAGAKU KOGYO K.K. In various experiments, various components, including copper chloride, copper iodide, carbon black, tin chloride and nickel chloride, were mixed in a proportion (by weight) set forth in Tables 1 to 4 below. The mixture was put in a porcelain boat, and then introduced into a tubular electric furnace in which the atmosphere within had been kept as set forth in Tables 1 to 4 and heated to a predetermined temperature as set forth in Tables 1 to 4 where it was then treated for a period of time as set forth in Tables 1 to 4.

The figures shown in the column of copper chloride, copper iodide, carbon black, tin chloride and nickel chloride in Tables 1 to 4 each indicate mixing ratio by weight. The figures in the column of argon, methane and hydrogen each indicate mixing ratio by volume in the atmosphere. In the experiments shown with temperature value described in the column of water and ethanol, argon, methane and hydrogen, singly or in admixture at the foregoing ratio, are allowed to pass through a scrubbing bottle containing water or ethanol which had been kept at the foregoing temperature so that the gas was saturated with water vapor or ethanol vapor (In the experiments shown with temperature value not described in the column of water and ethanol, the gas was provided with neither water vapor nor ethanol vapor). Tables 1 to 4 show the results of whether a feathery copper fiber body is produced or not under these conditions, the yield in production, and the observed shape of the feathery copper fiber body thus produced.

TABLE 1

| | Experiment example Nos. | | | | | | |
|---|---|---|---|---|---|---|---|
| | 1 | 2 | 3 | 4 | 5 | 6 | 7 |
| Copper chloride | 99 | | 99 | 99 | 99 | 99 | 99 |
| Copper iodide | | 190 | | | | | |
| Carbon black | 12 | 12 | 12 | 12 | 12 | 12 | 12 |
| Tin chloride | | | 3.3 | | | | |
| Nickel chloride | | | | 1 | | | |
| Argon | 100 | 100 | 100 | 100 | 60 | 80 | 100 |
| Methane | | | | | 40 | | |
| Hydrogen | | | | | | 20 | |
| Water | 80° C. | 80° C. | 80° C. | 80° C. | 80° C. | 80° C. | |
| Ethanol | | | | | | | 60° C. |
| Treatment temperature | 600° C. | 600° C. | 600° C. | 600° C. | 600° C. | 600° C. | 600° C. |
| Treatment time | 4 hr | 4 hr | 4 hr | 4 hr | 4 hr | 4 hr | 4 hr |
| Feathery copper fiber body produced? | Yes | Yes | Yes | Yes | Yes | Yes | Yes |
| Yield | 60.1% | 54% | 65.4% | 63.5% | 85% | 95% | 62.2% |
| Remarks (shape of feathery copper fiber body obtained, etc.) | | | Considerably great size | Considerably great size | | Considerably short fiber length | |

TABLE 2

| | Experiment example Nos. | | | | | | | | | | | | |
|---|---|---|---|---|---|---|---|---|---|---|---|---|
| | 8 | 9 | 10 | 11 | 12 | 13 | | 8 | 9 | 10 | 11 | 12 | 13 |
| Copper chloride | 99 | 99 | 99 | 99 | 99 | 99 | Water | 80° C. | 80° C. | 80° C. | 80° C. | 80° C. | 80° C. |
| Copper iodide | | | | | | | Ethanol | | | | | | |
| Carbon black | 12 | 12 | 12 | 12 | 12 | 12 | Treatment temperature | 300° C. | 400° C. | 500° C. | 600° C. | 600° C. | 600° C. |
| Tin chloride | | | | | | | Treatment time | 4 hr | 4 hr | 4 hr | 1 hr | 2 hr | 3 hr |
| Nickel chloride | | | | 1 | | | Feathery copper fiber body produced? | — | Yes | Yes | Yes | Yes | Yes |
| Argon | 100 | 100 | 100 | 100 | 100 | 100 | Yield | 0% | 3.2% | 12.1% | 37% | 48% | 58% |
| Methane | | | | | 40 | | | | | | | | |
| Hydrogen | | | | | | | | | | | | | |

TABLE 3

| | Experiment example Nos. | | | | | | |
|---|---|---|---|---|---|---|---|
| | 14 | 15 | 16 | 17 | 18 | 19 | 20 |
| Copper chloride | 99 | 99 | 99 | 99 | 99 | 99 | 99 |
| Copper iodide | | | | | | | |
| Carbon black | 12 | 12 | 12 | 12 | 12 | 12 | 12 |
| Tin chloride | | | | | | | |
| Nickel chloride | | | | | | | |
| Argon | 100 | 100 | 100 | 100 | 100 | 100 | 100 |
| Methane | | | | | | | |
| Hydrogen | | | | | | | |
| Water | 80° C. | 80° C. | 80° C. | 80° C. | 80° C. | 80° C. | 92° C. |
| Ethanol | | | | | | | |
| Treatment temperature | 700° C. | 700° C. | 700° C. | 700° C. | 800° C. | 900° C. | 600° C. |
| Treatment time | 0.5 hr | 1 hr | 2 hr | 3 hr | 0.5 hr | 0.5 hr | 3 hr |
| Feathery copper fiber body produced? | Yes | Yes | Yes | Yes | Yes | Yes | Yes |
| Yield | 48% | 54% | 53% | 54% | 24% | 20% | 60.3% |

TABLE 4

| | Experiment example Nos. | | | | | |
|---|---|---|---|---|---|---|
| | 21 | 22 | 23 | 24 | 25 | 26 |
| Copper chloride | 99 | 99 | 99 | 99 | 99 | 99 |
| Copper iodide | | | 190 | | | |
| Carbon black | 12 | 12 | 12 | 12 | 12 | 12 |
| Tin chloride | | | | | | 3.3 |
| Nickel chloride | | | | | | |
| Argon | 100 | 100 | 80 | 100 | 100 | 100 |
| Methane | | | | | | |
| Hydrogen | | | 20 | 40 | | |
| Water | 80°C. | 60°C. | 60°C. | 80°C. | | 80°C. |
| Ethanol | / | | | 60°C. | | |
| Treatment temperature | 600°C. | 600°C. | 600°C. | 700°C. | 600°C. | 700°C. |
| Treatment time | 3hr | 3hr | 3hr | 1hr | 1hr | 1 hr |
| Feathery copper fiber body produced? | Yes | Yes | Yes | Yes | Yes | Yes |
| Yield | 60% | 48% | 80% | 85% | 65% | 65% |

The procedure of heat treatment of Experiment Example 1 was followed except that copper chloride and carbon black were thoroughly dried at a temperature of 200° C. in an atmosphere free of water vapor. As a result, no feathery copper fiber body was produced.

The heat treatment procedure of Example 1 was followed except that 100% hydrogen gas was used instead of argon gas. As a result, only granular copper was obtained, but no feathery copper fiber body was formed.

Using a three-roll mill, the feathery copper fiber body obtained in Experiment Example 1 was mixed with a liquid unhardened phenolic resin at room temperature. As a result, it was confirmed that a good composite material comprising feathery copper fiber bodies uniformly dispersed therein having a better dispersibility than copper whisker fiber and copper powder according to the conventional technique had been obtained.

Further, the foregoing feathery copper fiber body was analyzed for composition. As a result, it was confirmed that the products free of halide of metal other than copper each have a copper content of not less than 99% by weight.

The feathery copper fiber bodies obtained in the foregoing experiment examples will be further described in connection with scanning electron microphotograph (SEM).

Figure 2:
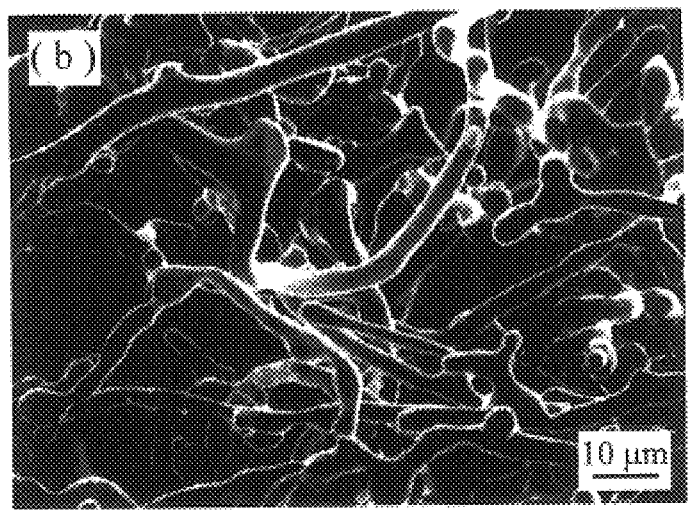
FIG. 2 is a partly enlarged photograph of the feathery copper fiber body of FIG. 1.
Figure 3:
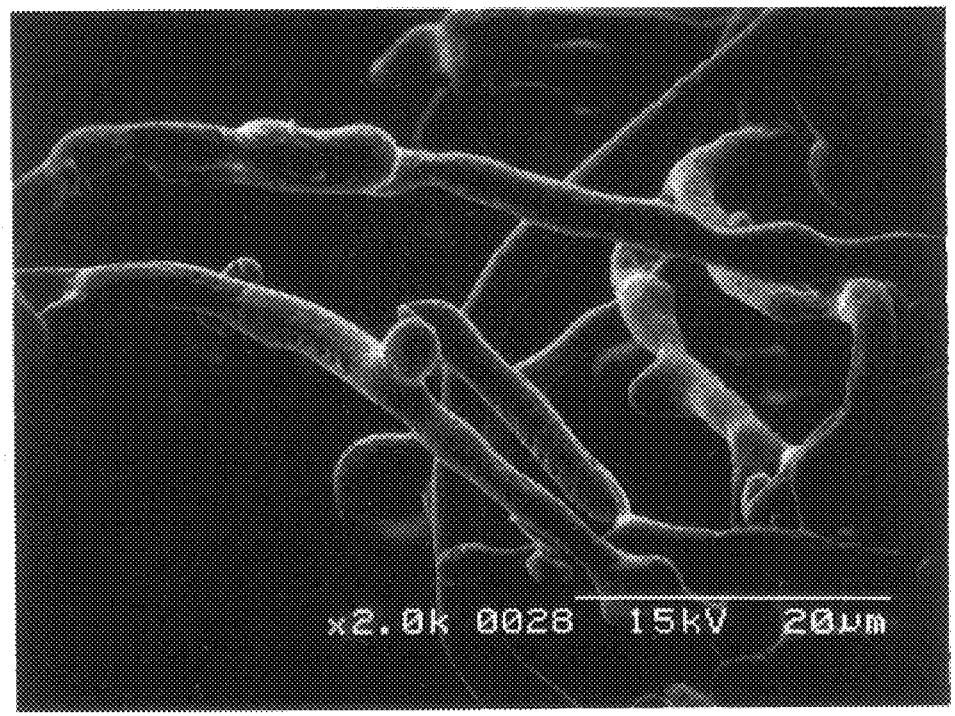
FIG. 3 is a scanning electron microphotograph illustrating another portion of the feathery copper fiber body of FIG. 1.
Figure 4:
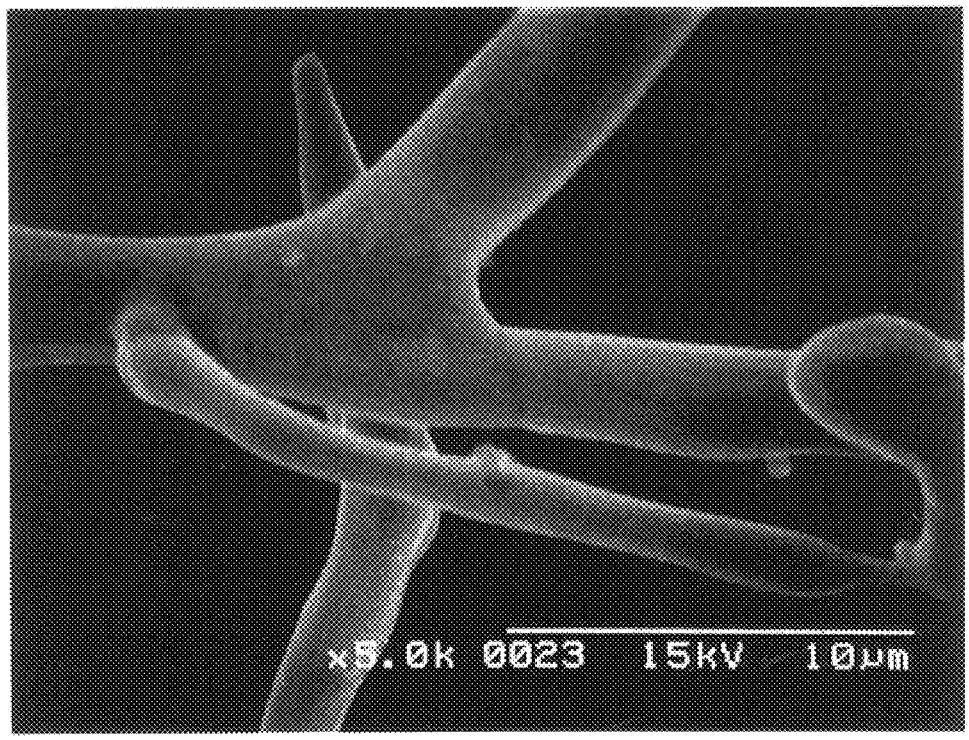
FIG. 4 is a scanning electron microphotograph illustrating another portion of the feathery copper fiber body of FIG. 1.

FIG. 1 is SEM illustrating the feathery copper fiber body according to the present invention obtained in Experiment Example 13. FIG. 2 is a partly enlarged view of the feathery copper fiber body of FIG. 1. FIGS. 3 and 4 each are an enlarged SEM illustrating another portion of the feathery copper fiber body of FIG. 1. It can be seen in these SEM's that the feathery copper fiber body is branched, curved and constricted.

Figure 5:
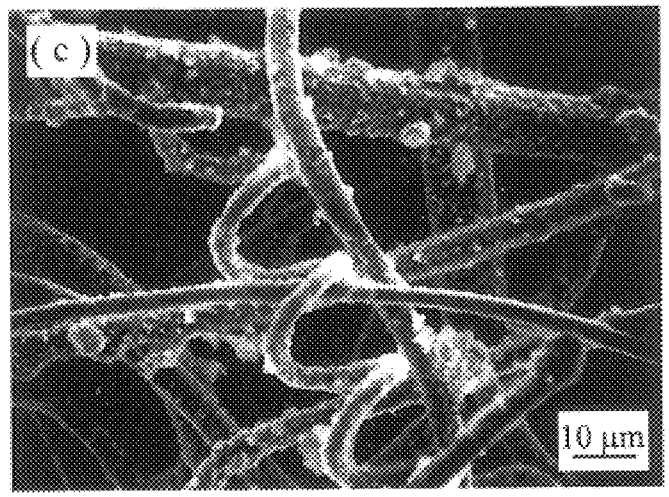
FIG. 5 is an enlarged scanning electron microphotograph of a portion of a feathery copper fiber body in which a copper microcoil is formed.
Figure 6:
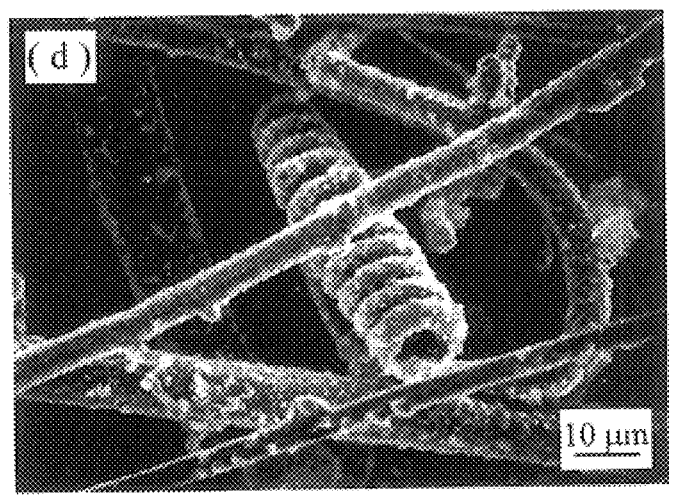
FIG. 6 is an enlarged scanning electron microphotograph of another portion of a feathery copper fiber body in which a copper microcoil is formed.

FIGS. 5 and 6 each illustrate an example of SEM of the feathery copper fiber body of Experiment Example 22. The feathery copper fiber body according to the present invention comprises coiled portions (copper microcoil) scattered therein as can be seen in these SEM's. These microcoils are formed by a wire material having a diameter of from not less than 0.1 $\mu$m to not more than 25 $\mu$m and has an outer diameter of from not less than 0.2 $\mu$m to not more than 50 $\mu$m. These microcoils were easily withdrawn by a micromanipulator. In particular, many coils having an outer diameter of not more than 20 $\mu$m formed by a wire material having a diameter of not more than 8 $\mu$m were found.

Such a copper microcoil has never been known. In the application of various microcoils made of carbon which are now under study (e.g., member of micromachine, parts of oscillating machine, electromagnetic wave absorbing materials), combined with excellent properties common to copper materials such as far higher electrical conductivity and thermal-oxidative stability than these carbon microcoils, the foregoing properties of copper microcoils has an infinitive possibility for new material.

The feathery copper fiber body according to the present invention is a novel fiber body which can be incorporated in high molecular materials as an electrically-conducting material, electromagnetic barrier material or reinforcing material to provide these matrixes with excellent properties.

What is claimed is:

1. A fine fiber body, wherein said fiber body is made of copper, and has branched portions that are randomly oriented.

2. The fiber body of claim 1, wherein said branched portion has a diameter in the range of 0.1 $\mu$m to 25 $\mu$m.

3. The fiber body of claim 1, wherein a length of said fiber body is not more than 4 cm.

4. The fiber body of claim 1, wherein said branched portion extends outwardly in a first direction, and wherein said branched portion is curved, such that a section of said branched portion extends in a direction different from said first direction.

5. The fiber body of claim 1, wherein said fiber body has a constricted area, such that a diameter of said fiber body in said constricted area is of a different size than diameters of areas that extend from both sides of said constricted area.

6. A composite material comprising:

a fine copper fiber body having branched portions that are randomly oriented, incorporated therein as a filler.

7. The composite material of claim 6, wherein said branched portion extends outwardly in a first direction, and wherein said branched portion is curved, such that a section of said branched portion extends in a direction different from said first direction.

8. The composite material of claim 6, wherein said fiber body has a constricted area, such that a diameter of said fiber body in said constricted area is different than areas that extend from both sides of the constricted area.

* * * * *